(12) United States Patent
Shustef et al.

(10) Patent No.: US 8,570,572 B2
(45) Date of Patent: Oct. 29, 2013

(54) METHOD AND APPARATUS FOR PRINTING WEB-BASED CONTENT VIA CLOUD PRINT SERVICE

(75) Inventors: Yevgeniy Shustef, Macedon, NY (US); Brian R. King, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 188 days.

(21) Appl. No.: 13/116,166

(22) Filed: May 26, 2011

(65) Prior Publication Data

US 2012/0300249 A1 Nov. 29, 2012

(51) Int. Cl.
*G06F 3/12* (2006.01)

(52) U.S. Cl.
USPC ........ 358/1.15; 358/1.14; 358/1.13; 709/217; 709/218; 709/219

(58) Field of Classification Search
USPC ................................................ 358/1.13–1.16
See application file for complete search history.

(56) References Cited

U.S. PATENT DOCUMENTS

| | | | |
|---|---|---|---|
| 6,211,874 B1 * | 4/2001 | Himmel et al. | 715/781 |
| 6,856,415 B1 * | 2/2005 | Simchik et al. | 358/1.15 |
| 6,958,824 B2 * | 10/2005 | Whitmarsh | 358/1.15 |
| 7,443,523 B2 | 10/2008 | Leone, III et al. | |
| 8,314,960 B2 * | 11/2012 | Trappe | 358/1.15 |
| 2002/0196460 A1 * | 12/2002 | Parry | 358/1.15 |
| 2003/0035133 A1 * | 2/2003 | Berkema et al. | 358/1.15 |
| 2003/0169446 A1 * | 9/2003 | Grohs et al. | 358/1.15 |
| 2004/0196491 A1 * | 10/2004 | Uchino | 358/1.15 |
| 2005/0149565 A1 * | 7/2005 | Oak et al. | 707/104.1 |

* cited by examiner

*Primary Examiner* — Twyler Haskins
*Assistant Examiner* — Dennis Dicker
(74) *Attorney, Agent, or Firm* — Fay Sharpe LLP

(57) ABSTRACT

A method for printing web-based content via a cloud print service includes: a) receiving a print request at an interface server of a print interface service, the print request associated an interface record adapted to store a print URL linked to an original URL with web-based content desired to be printed via a cloud print service; b) obtaining the web-based content associated with the original URL from a host server; and c) sending a job request and the obtained web-based content to the cloud print service for printing the desired web-based content. The interface server may include a controller, a consumer user communication module, a storage device, a print content communication module, and a cloud print communication module. The method may include receiving a record request requesting assignment of the print URL and identifying the original URL, assigning the print URL, and storing the print URL, original URL, and link.

25 Claims, 6 Drawing Sheets

METHOD AND APPARATUS FOR PRINTING WEB-BASED CONTENT VIA CLOUD PRINT SERVICE

BACKGROUND

The present exemplary embodiment relates generally to printing web-based content via a cloud print service. It finds particular application in using a print uniform resource locator (URL) service to link an original URL for web-based content to a print URL that can be embedded in a source document as a widget, such as a hypertext link, an interactive control, or a combination thereof. The embedded widget can be activated when the web-based content associated with the original URL is desired to be printed via the cloud print service. However, it is to be appreciated that the exemplary embodiments described herein are also amenable to linking multiple original URLs to the print URL, to linking an original URL for the source document to the print URL, to linking various types of web-based content to the print URL, and to embedding the widget in various types of source documents in various combinations.

Traditionally printing is done behind a firewall using either a network-connected or locally-connected printing device where document submission, conversion, and printing happen in the same environment. With the rapid emergence of cloud-based printing options, some or all of these activities are moving to the cloud and operating across firewalls. For example, U.S. Pat. No. 7,443,523 to Leone, III et al., assigned to Xerox Corporation of Norwalk, Conn., discloses a method for printing at a networked client site from a document processing application running on a remote server. Xerox and other businesses provide products and services that provide cloud print services that implement this methodology or similar methodologies.

A current challenge is in integrating a variety of web sources of content with cloud-based print services. For example, web-based content appears in blogs, social network messages and other postings, such as Twitter tweets, Facebook postings, Myspace postings, e-mail messages, chat room dialogs, instant message dialogs, online document repositories, and traditional web sites and web pages. One way to print such web-based content is the traditional driver based approach which may either use a File/Print pull-down or popup menu associated with the browser, a "Printer" icon associated with the browser, or a "Printer" icon/link embedded in the web-based content that uses embedded commands or script technologies, such as JavaScript, to bring up a standard operating system (OS) print driver window or to automatically activate the standard OS print driver. However, this does not work well for the emerging cloud print services which may receive content for printing via web uploads, application program interface (API) calls, e-mail messages, or other types of integration. These integrations to cloud print services usually involve the need to write customized code for the ultimate user experience or force users to use suboptimal methods, such as attachments to e-mail, to deliver the content for printing. In fact, if one wanted to print a blog article via a cloud print service, they would have no way to print it directly and the author of the blog would not be able to do anything to enable or facilitate cloud printing.

Based on the foregoing, there is a need for printing certain types of web-based content via cloud print services that cannot be printed in this manner. Additionally, there is a need for simplifying techniques for printing other types of web-based content that can currently be printed via cloud print services. Moreover, the simplified techniques should reduce the technical knowledge required for authors of web-based content and web applications to enable the printing of web-based content via cloud print services as well as the technical knowledge required for consumer users to print the corresponding web-based content.

INCORPORATION BY REFERENCE

U.S. Pat. No. 7,443,523 to Leone, III et al., issued Oct. 28, 2008, assigned to Xerox Corporation of Norwalk, Conn., is fully incorporated herein by reference.

BRIEF DESCRIPTION

In one aspect, a method for printing web-based content via a cloud print service in provided. In one embodiment, the method includes: a) receiving a print request from a user device at an interface server via a communication network, the interface server being associated with a print interface service and in operative communication with a cloud print service, the print request being associated with an interface record at least temporarily stored in a storage device accessible to the interface server, the interface record being associated with a print uniform resource locator (URL) linked to one or more original URLs comprising web-based content desired to be printed via the cloud print service by a consumer user using the user device; b) obtaining the web-based content associated with the one or more original URLs from one or more host servers on which the corresponding web-based content is stored; and c) sending a job request and the obtained web-based content to the cloud print service from the interface server for printing the desired web-based content via the cloud print service for the consumer user.

In another aspect, an apparatus for printing web-based content via a cloud print service is provided. In one embodiment, the apparatus includes an interface server in operative communication with a cloud print service. In this embodiment, an exemplary embodiment of the interface server includes: a controller for controlling operations of the interface server to provide a print interface service; a consumer user communication module in operative communication with the controller for receiving a print request from a user device via a communication network; a storage device in operative communication with the controller for at least temporarily storing an interface record associated with the print request, the interface record being associated with a print uniform resource locator (URL) linked to one or more original URLs comprising web-based content desired to be printed via the cloud print service by a consumer user using the user device; a print content communication module in operative communication with the controller for obtaining the web-based content associated with the one or more original URLs from one or more host servers on which the corresponding web-based content is stored; and a cloud print communication module in operative communication with the controller for sending a job request and the obtained web-based content to the cloud print service for printing the desired web-based content via the cloud print service for the consumer user.

In yet another aspect, another method for printing web-based content via a cloud print service is provided. In one embodiment, the method includes: a) receiving a record request from an author device at an interface server via a communication network, the interface server being associated with a print interface service and in operative communication with a cloud print service, the record request requesting assignment of a print uniform resource locator (URL) from a plurality of unassigned print URLs managed by the interface server and identifying one or more original URLs, the one or more original URLs comprising web-based content that an author user using the author device desires to enable to be printed via the cloud print service when the print URL is specified in a print request to the interface server; b) assigning the print URL to an interface record stored in a storage device accessible to the interface server; c) storing the print URL, the one or more original URLs, and corresponding links between the print URL and one or more original URLs in the interface record; d) receiving a print request from a user device at the interface server via the communication network, the print request including the print URL assigned in b) and indicating a consumer user using the user device desires to print the web-based content associated with the print URL via the cloud print service; e) obtaining the web-based content associated with the one or more original URLs from one or more host servers on which the corresponding web-based content is stored; and f) sending a job request and the obtained web-based content to the cloud print service from the interface server for printing the desired web-based content via the cloud print service for the consumer user.

DETAILED DESCRIPTION

This disclosure describes various embodiments of methods and print interface services for printing web-based content via cloud print services. For example, the print interface service can be used to link an original URL for web-based content to a print URL that can be embedded in a source document as a widget, such as a hypertext link, an interactive control, or a combination thereof. The embedded widget can be activated when the web-based content associated with the original URL is desired to be printed via the cloud print service. In other embodiments, the print interface service can be used to link multiple original URLs to the print URL, to link an original URL for the source document to the print URL, and to link various types of web-based content to the print URL in various combinations. Similarly, the print interface service can be used to create the print URL and provision various parameters which would subsequently be used to print the associated web-based content via the cloud print service when the corresponding widget in the source document is activated.

The various embodiments of methods and apparatus disclosed herein strive to solve the problems described above regarding the use of cloud print services to print web-based content by utilizing a specially assigned or constructed print uniform resource locator (URL) in conjunction with a print URL service. The corresponding print URL allows end users or consumers to click or activate an embedded icon, hypertext link, or another type of widget from the web-based content to get the desired content printed via the cloud print service, The techniques disclosed here do not require consumers to have specialized technical knowledge to print web-based content via cloud print services. The techniques also do not require authors of web-based content or web applications to have specialized technical knowledge to enable or provision for the printing of web-based content via cloud print services.

The print URL service may use a URL redirecting technique similar to those used by URL shortening services, such as TinyURL offered by TinyURL, LLC of Blaine, Minn. However, a web-based print URL provided by the print URL service does not simply redirect the user to the source of the web-based content. Rather, it redirects the user to a cloud print page where they can select a printer for printing the web-based content and activate the printing. The print URL service may also automatically forward the web-based content to the cloud print service for printing if a default or pre-selected cloud print printer is used.

Figure 1:
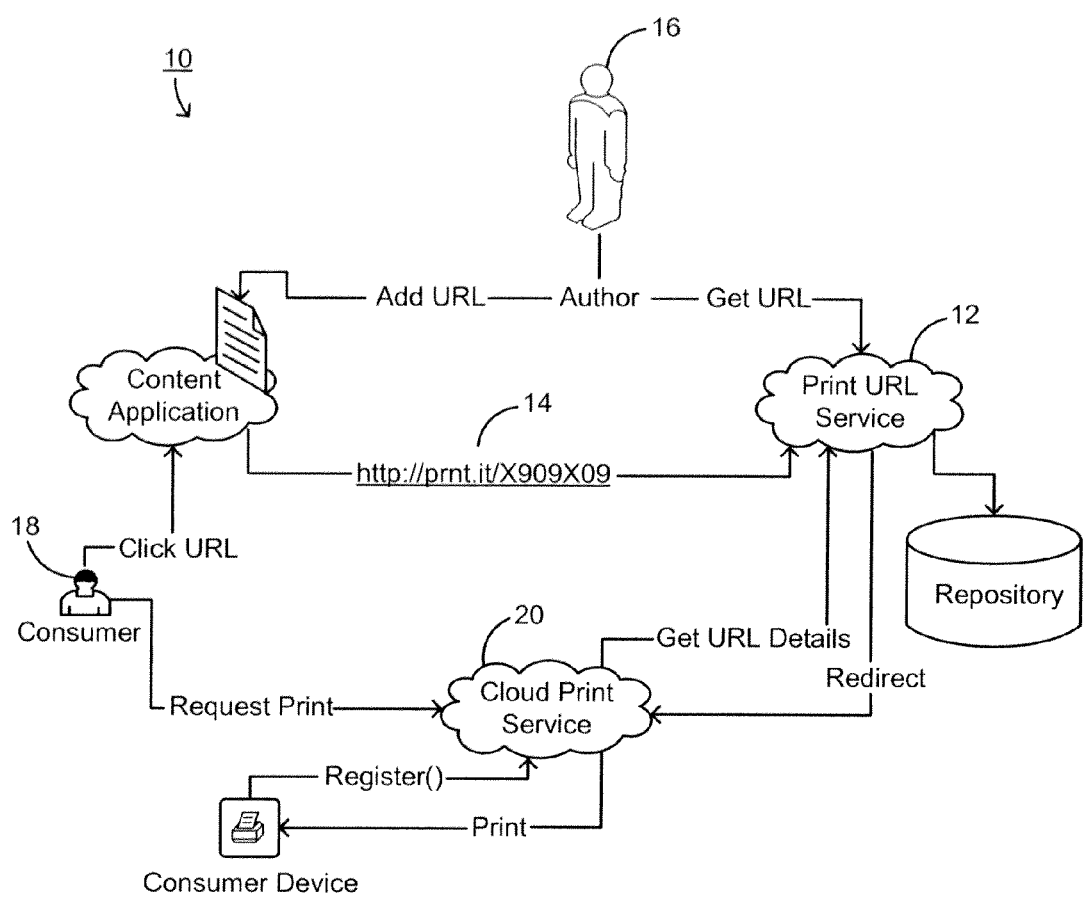
FIG. 1 is a block diagram of an exemplary embodiment of a communication system infrastructure for printing web-based content via a cloud print service.

With reference to FIG. 1, an exemplary communication system infrastructure 10 depicts how an embodiment of a print URL service 12 may permit a web-based print URL 14 to be created via a web page or a web service by the author or host 16 of the web-based content. The web-based print URL 14 is associated with specific web-based content to be printed. The web-based print URL 14 may also be associated with a source repository, security options, a cloud print service, default print options, and content type. Authors 16 of web-based content or web applications may add a widget within a web page or other web-based content that allows users 18 to print the corresponding web-based content via a cloud print service 20 using the embedded widget. The web-based content desired to be printed is linked to the embedded widget and web-based print URL 14 via the print URL service 12. The widget, for example, allows web-content providers to add a simple JavaScript file to the hosted web content which will utilize the print URL service to create a link to their corresponding host web page. The widget, when clicked by a user, may create a web-based print URL 14 for the web page and link the user to the cloud print service 20 to print the associated web-based content. The widget and web-based print URL 14 may also be linked to a different URL (i.e., hosted web page) than the web page that contains the widget. In other words, the author 16 of the web-based content or web application can specify the web-based print URL 14 independent of the URL (i.e., hosted web page) for the web page in which the widget is embedded.

In one embodiment of a process for printing web-based content via a cloud print service, the process begins with a web-based content author creating a web-based print URL using a print URL service. Next, the web-based content author includes the web-based print URL in the web-based content to be printed (e.g., original content, tweet, online message, e-mail, etc.). In this embodiment, after a consumer clicks on the web-based print URL, the consumer is redirected to a cloud print service associated with the web-based print URL. From the web-based print URL, the cloud print service understands which web-based content is requested to be printed, how to retrieve the desired content from the original web-based source, and how to print the desired content.

The consumer may select one available cloud printer from a list of cloud printers available via the cloud print service. Then, the consumer clicks "Print" and picks up the printed content at the selected cloud printer.

In another embodiment of a process for printing web-based content via a cloud print service, the process begins with a web-based content author creating a web-based print URL using a web or native device application that serves as a front-end to a print URL service. The web-based print URL may follow a predetermined format, such as http://prnt.it/X909X09 where "prnt.it" defines a URL for a host for the print URL service and "X909X09" is a special key used to identify the requested resources associated with the web-based content that is to be printed.

In this embodiment, the web-based print URL is associated with a source document URL, such as http://www.cnn.com/article.pdf. The web-based print URL may also be associated with a source document repository, such as box.net or sharepoint-on-line. The web-based print URL may include source document repository credentials, such as a user name and password. The web-based print URL may also identify a source document type, such as web page, PDF, etc. The web-based print URL may also be associated with a cloud print service, such as Xerox's cloud print service. The web-based print URL may include default print options, such as color, A4, etc. Other optional and required parameters can be associated with the web-based print URL.

In additional embodiments, the information stored with the web-based print URL may be stored in a print URL service repository, such as a server, disk drive, or any suitable storage device. The web-based print URL can be embedded in any web-based content or web page capable of displaying it or using it to direct the corresponding web-based content associated with the web-based print URL to the cloud print service associated with the web-based print URL. Upon the invocation or activation of the web-based print URL, the print URL service redirects the consumer to the cloud print service. The cloud print service can query the print URL service for the options associated with the web-based print URL. The cloud print service can fulfill the print request for the web-based content associated with the web-based print URL based on its implementation.

There are several ways of making the URL redirection associated with the print URL service available for web-based content that is desired to be printed via a cloud print service. For example, at least three techniques can be used to access and exploit the benefits of the print URL service: i) using a portal to access the print URL service and define the web-based print URL, ii) using a widget to access the print URL service, and iii) using a representational state transfer (REST) service call to access the print URL service and define the web-based print URL. These techniques allow any type of user or consumer to benefit from the print URL service.

As for using the portal, ordinary users can provide the print URL service with a link to a web-based file that is desired to be printed via the cloud print service. This link can be shared with other users. This provides a simple interface for users that are not technically savvy enough or for users that simply prefer not to create their own web-based print URL.

As for using the widget, web site authors have the ability to embed, for example, a custom JavaScript widget on their authored web page. The embedded widget, for example, allows users to print the content of the web page by clicking or otherwise activating the widget. The widget can create the web-based print URL and provide a link to the original web-based content so that the content can be printed via the cloud print service. The actions that follow activation of the widget can be transparent to the user. There may also be interaction between the print URL service and the user following activation of the widget in order to dynamically provide source document or cloud print parameters, dynamically select default parameters, dynamically edit previously used or default parameters, or any suitable combination thereof. The user may also have the option of saving the dynamic selections for the web-based print URL with the print URL service for reuse the next time the web-based print URL is activated. The widget allows users to have easy access to printing web-based content via the cloud print service when on the go or even on their home computers. The widget also works on smartphones and other devices that support the embedded script that is processed when the widget is activated, such as JavaScript.

As for the REST service call, the print URL service can accept REST service calls from a third party. Therefore, if a third party wants to use a custom implementation that defines one or more web-based print URLs for printing web-based content via a cloud print service, the print URL service give them the ability to do so by simply using a corresponding REST service call.

Figure 2:
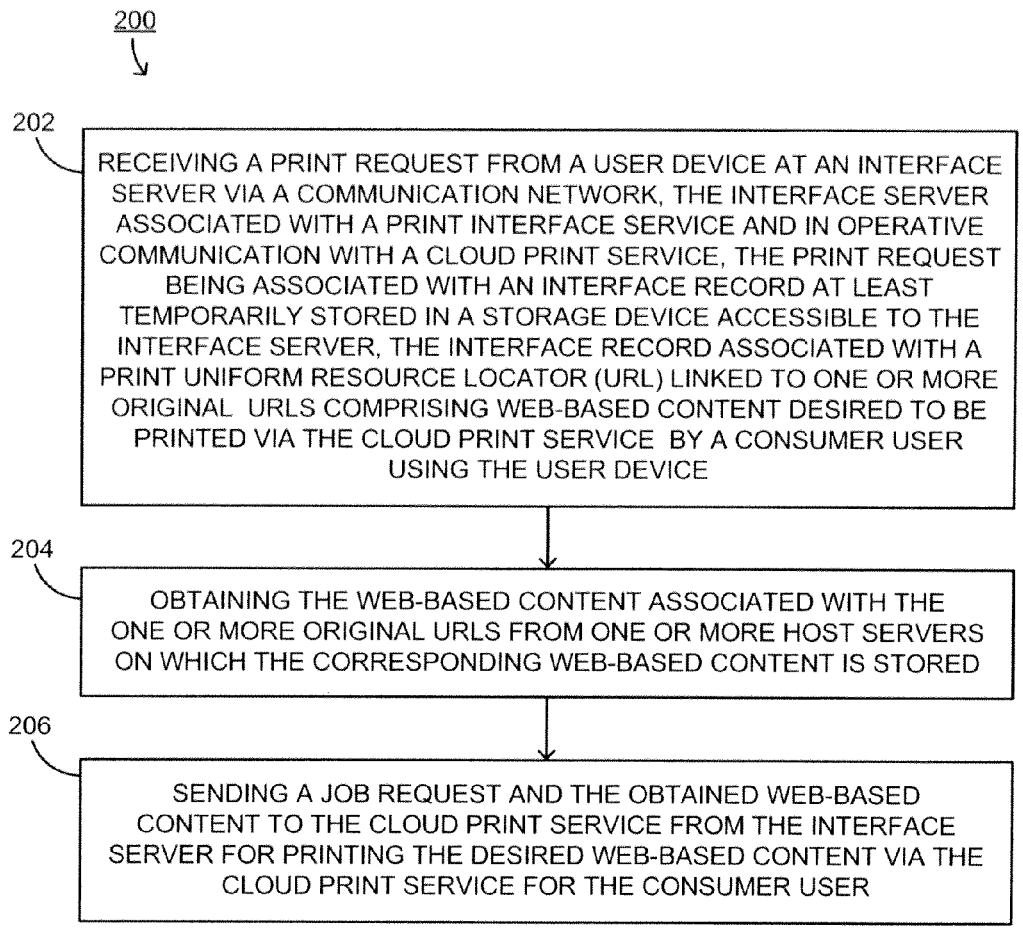
FIG. 2 is flowchart of an exemplary embodiment of a process for printing web-based content via a cloud print service.

With reference to FIG. 2, an exemplary embodiment of a process 200 for printing web-based content via a cloud print service begins at 202 where a print request is received from a user device at an interface server via a communication network. The interface server being associated with a print interface service and in operative communication with a cloud print service. The print request being associated with an interface record at least temporarily stored in a storage device accessible to the interface server. The interface record being associated with a print URL linked to one or more original URLs comprising web-based content desired to be printed via the cloud print service by a consumer user using the user device. Next, the web-based content associated with the one or more original URLs is obtained from one or more host servers on which the corresponding web-based content is stored (204). At 206, a job request and the obtained web-based content are sent to the cloud print service from the interface server for printing the desired web-based content via the cloud print service for the consumer user.

In another embodiment of the process 200, the print request received in 202 is based at least in part on the consumer user activating an interactive control embedded in a content file displayed on the user device, the interactive control associated with a hypertext link that directs the print request to the print interface service after the interactive control is activated. In a further embodiment of this embodiment, the interactive control and the hypertext link were embedded in the content file by an author user using an author device prior to the content file being accessed by the consumer user via the user device. In another further embodiment of this embodiment, the web-based content desired to be printed comprises the content file displayed on the user device.

Figure 3:
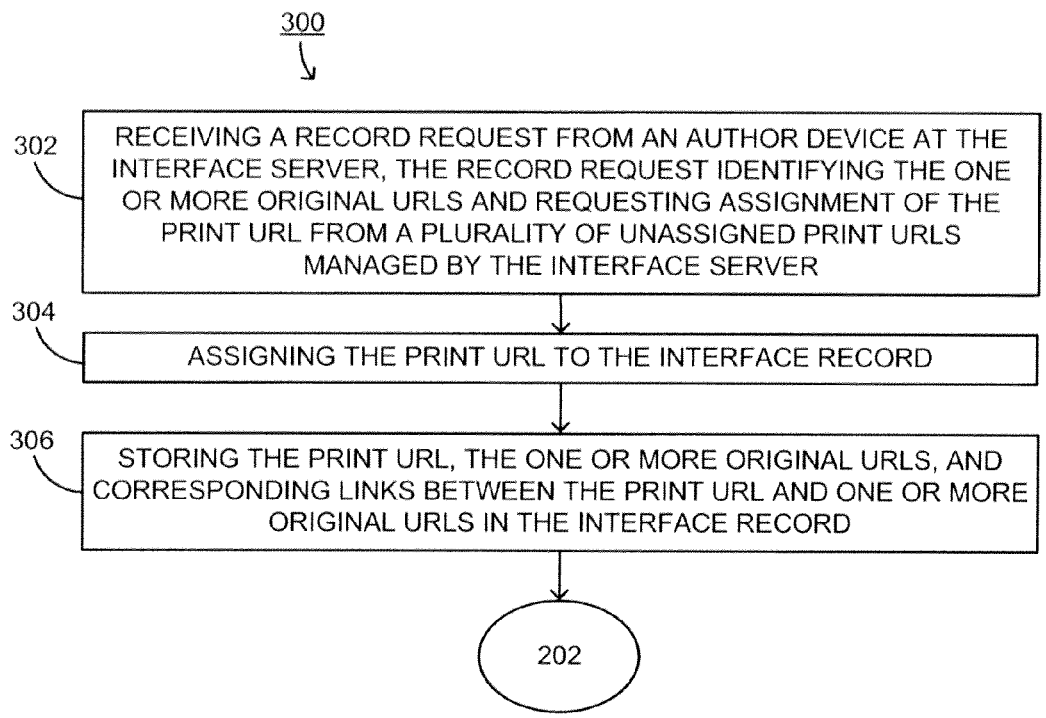
FIG. 3, in combination with FIG. 2, is flowchart of another exemplary embodiment of a process for printing web-based content via a cloud print service.

With reference to FIGS. 2 and 3, an exemplary embodiment of a process 300 for printing web-based content via a cloud print service may begin at 302 where a record request is received from an author device at the interface server. The record request identifying the one or more original URLs and requesting assignment of the print URL from a plurality of unassigned print URLs managed by the interface server. Next, the print URL is assigned to the interface record (304). At 306, the print URL, the one or more original URLs, and corresponding links between the print URL and one or more original URLs are stored in the interface record. The process 300 may continue to 202 at this point. In another embodiment of the process 300, the print request received in 202 includes the print URL assigned in 304 such that the print request is thereby associated with the interface record in conjunction with the obtaining in 204 and the sending in 206.

In yet another embodiment, the process 300 may also include sending a parameter request to the user device from the interface server for confirmation by the consumer user of the one or more original URLs stored in the interface record or for revision thereof by the consumer user. In this embodiment, a parameter response is received from the user device confirming or revising the one or more original URLs based at least in part on interaction by the consumer user.

In still another embodiment of the process 300, the record request received in 302 includes security credential parameters to restrict use of the print URL. The security credential parameters are stored in the interface record in conjunction with the storing in 306. In this embodiment, the process 300 may also include sending an authentication request to the user device for security credential parameters for use of the print URL in response to receiving the print request in 202. Next, an authentication response with security credential parameters is received from the user device at the interface server. The process 300 continues by enabling use of the print URL in conjunction with the obtaining in 204 and the sending in 206 based at least in part on successfully authenticating the security credential parameters received in the authentication response with the security credential parameters stored in the interface record.

In still yet another embodiment of the process 300, the record request received in 302 includes source repository parameters associated with the web-based content desired to be printed. The source repository parameters are stored in the interface record in conjunction with the storing in 306 such that the obtaining in 204 is based at least in part on the source repository parameters stored in the interface record. In a further embodiment, the process 300 may also include sending a parameter request to the user device from the interface server for confirmation by the consumer user of the source repository parameters stored in the interface record or for revision thereof by the consumer user. In this embodiment, a parameter response is received from the user device confirming or revising the source repository parameters based at least in part on interaction by the consumer user.

In another embodiment of the process 300, the record request received in 302 includes document type parameters associated with the web-based content desired to be printed. The document type parameters are stored in the interface record in conjunction with the storing in 306 such that the obtaining in 204 is based at least in part on the document type parameters stored in the interface record. In a further embodiment, the process 300 may also include sending a parameter request to the user device from the interface server for confirmation by the consumer user of the document type parameters stored in the interface record or for revision thereof by the consumer user. In this embodiment, a parameter response is received from the user device confirming or revising the document type parameters based at least in part on interaction by the consumer user.

In yet another embodiment of the process 300, the record request received in 302 identifies the cloud print service. The identified cloud print service is stored in the interface record in conjunction with the storing in 306 such that the sending in 206 is based at least in part on the cloud print service stored in the interface record. In a further embodiment, the process 300 may also include sending a parameter request to the user device from the interface server for confirmation by the consumer user of the cloud print service stored in the interface record or for revision thereof by the consumer user. In this embodiment, a parameter response is received from the user device confirming or revising the cloud print service based at least in part on interaction by the consumer user.

In still another embodiment of the process 300, the record request received in 302 includes default print parameters. The default print parameters are stored in the interface record in conjunction with the storing in 306 such that the job request associated with the sending in 206 is based at least in part on the default print parameters stored in the interface record. In a further embodiment, the process 300 may also include sending a parameter request to the user device from the interface server for confirmation by the consumer user of the default print parameters stored in the interface record or for revision thereof by the consumer user. In this embodiment, a parameter response is received from the user device confirming or revising the default print parameters based at least in part on interaction by the consumer user.

Figure 4:
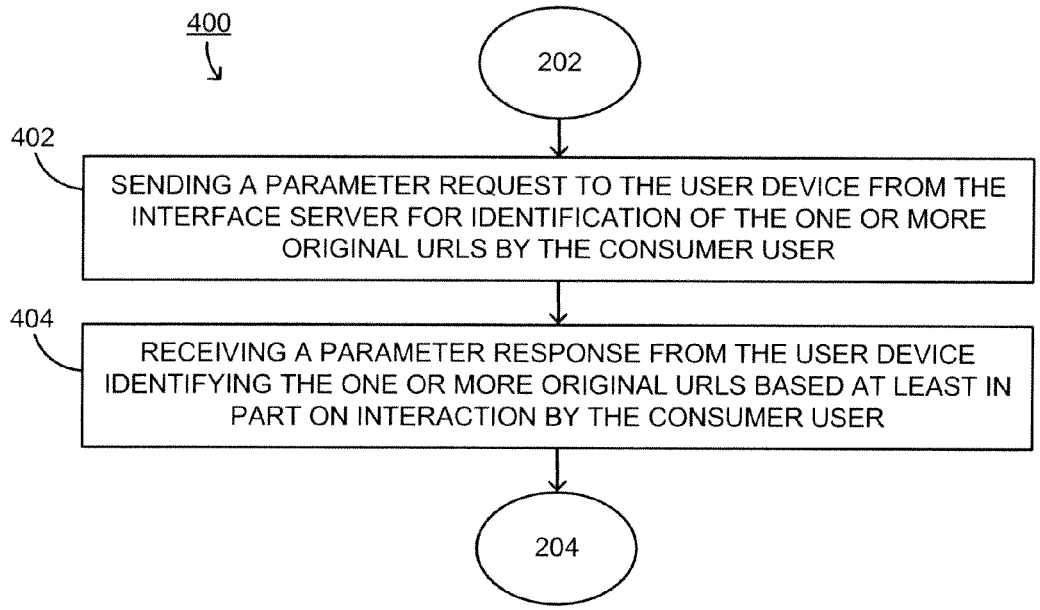
FIG. 4, in combination with FIG. 2, is flowchart of yet another exemplary embodiment of a process for printing web-based content via a cloud print service.

With reference to FIGS. 2 and 4, an exemplary embodiment of a process 400 for printing web-based content via a cloud print service may continue from 202 to 402 where a parameter request is sent to the user device from the interface server for identification of the one or more original URLs by the consumer user. Next, a parameter response is received from the user device identifying the one or more original URLs based at least in part on interaction by the consumer user (404).

In another embodiment, the process 400 may also include assigning the print URL to the interface record prior to receiving the print request in 202. In this embodiment, the print URL, the one or more original URLs, and corresponding links between the print URL and one or more original URLs are stored in the interface record. In a further embodiment of the process 400, the print request received in 202 includes the print URL assigned to the interface record such that the print request is thereby associated with the interface record in conjunction with the obtaining in 204 and the sending in 206.

In yet another embodiment of the process 400, the parameter request sent in 402 is also for identification of source repository parameters by the consumer user. The source repository parameters being associated with the web-based content desired to be printed. In this embodiment, the source repository parameters are identified in the parameter response received in 404 such that the obtaining in 204 is based at least in part on the source repository parameters identified by the consumer user.

In still another embodiment of the process 400, the parameter request sent in 402 is also for identification of document type parameters by the consumer user. The document type parameters being associated with the web-based content desired to be printed. In this embodiment, the document type parameters are identified in the parameter response received in 404 such that the obtaining in 204 is based at least in part on the document type parameters identified by the consumer user.

In still yet another embodiment of the process 400, the parameter request sent in 402 is also for identification of the cloud print service by the consumer user. In this embodiment, the cloud print service is identified in the parameter response received in 404 such that the sending in 206 is based at least in part on the cloud print service identified by the consumer user.

In another embodiment of the process, the parameter request sent in 402 is also for identification of default print parameters by the consumer user. In this embodiment, the default print parameters are identified in the parameter response received in 404 such that the job request associated with the sending in 206 is based at least in part on the default print parameters identified by the consumer user.

With reference again to FIG. 2, another embodiment of the process 200 may also include sending a confirmation request to the user device from the interface server to permit the consumer user to authorize, revise, or cancel the job request in conjunction with the sending in 206. In this embodiment, a confirmation response is received from the user device confirming, revising, or canceling the job request based at least in part on interaction by the consumer user.

Figure 5:
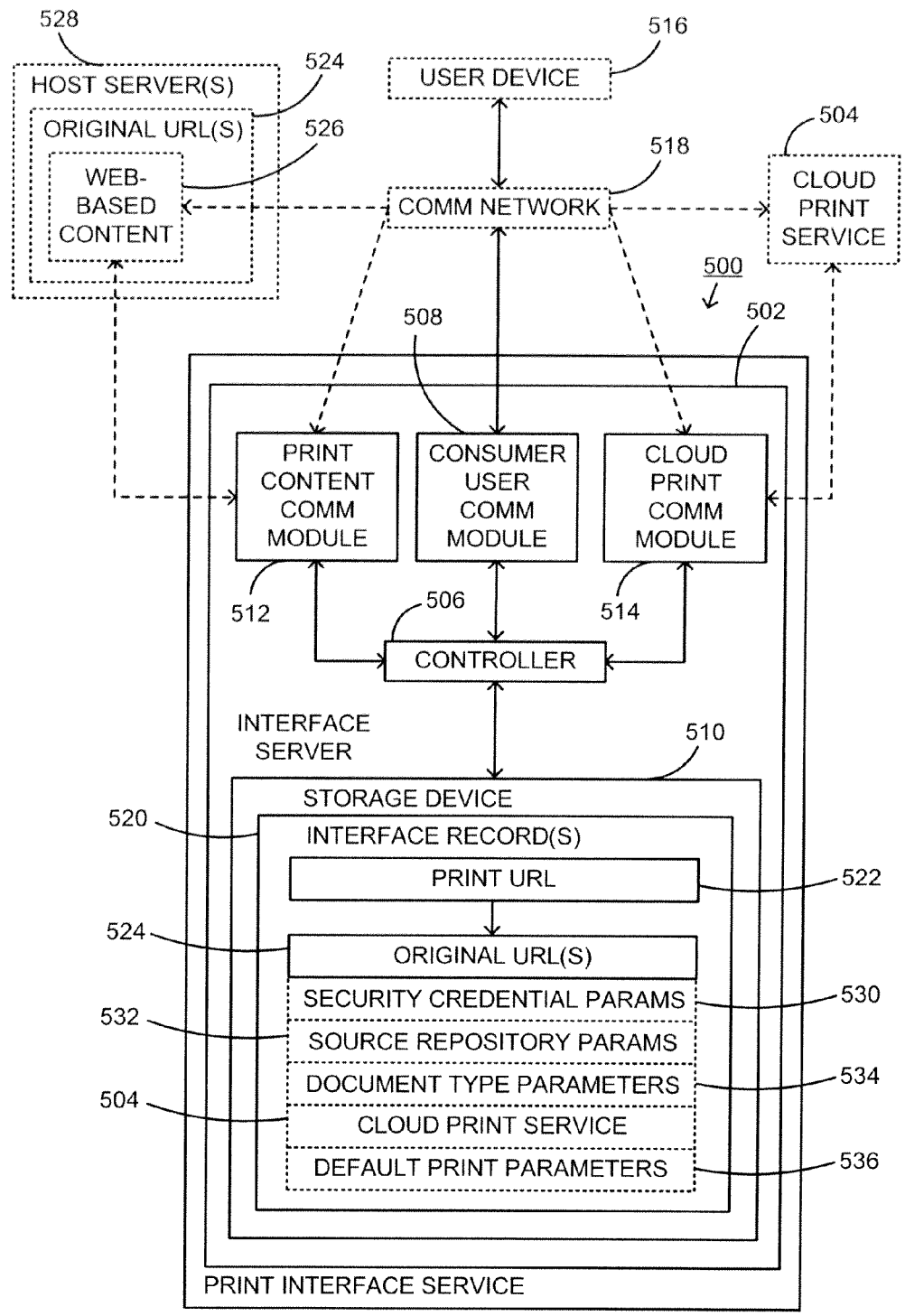
FIG. 5 is a block diagram of an exemplary embodiment of a print interface service for printing web-based content via a cloud print service.

With reference to FIG. 5, an exemplary embodiment of a print interface service 500 for printing web-based content via a cloud print service includes an interface server 502 in operative communication with a cloud print service 504. An exemplary embodiment of the interface server 502 includes a controller 506, a consumer user communication module 508, a storage device 510, a print content communication module 512, and a cloud print communication module 514. The controller 506 for controlling operations of the interface server 502 to provide the print interface service 500. The consumer user communication module 508 in operative communication with the controller 508 for receiving a print request from a user device 516 via a communication network 518. The communication network 518 may be any suitable type of communication network. The communication network 518 may include multiple communication networks of various types in any suitable combination.

The storage device 510 in operative communication with the controller 506 for at least temporarily storing an interface record 520 associated with the print request. The interface record 520 being associated with a print URL 522 linked to one or more original URLs 524 comprising web-based content 526 desired to be printed via the cloud print service 504 by a consumer user using the user device 516. The print content communication module 512 in operative communication with the controller 506 for obtaining the web-based content 526 associated with the one or more original URLs 524 from one or more host servers 528 on which the corresponding web-based content 526 is stored. Communications between the print content communication module 512 and the one or more host servers 528 may be via the communication network 518 or via any suitable communication technique. The cloud print communication module 514 in operative communication with the controller 506 for sending a job request and the obtained web-based content to the cloud print service 504 for printing the desired web-based content 526 via the cloud print service 504 for the consumer user. Communications between the cloud print communication module 514 and the cloud print service 504 may be via the communication network 518 or via any suitable communication technique.

In another embodiment of the print interface service 500, the print request received by the consumer user communication module 508 is based at least in part on the consumer user activating an interactive control embedded in a content file displayed on the user device 516. The interactive control being associated with a hypertext link that directs the print request to the consumer user communication module 508 after the interactive control is activated.

Figure 6:
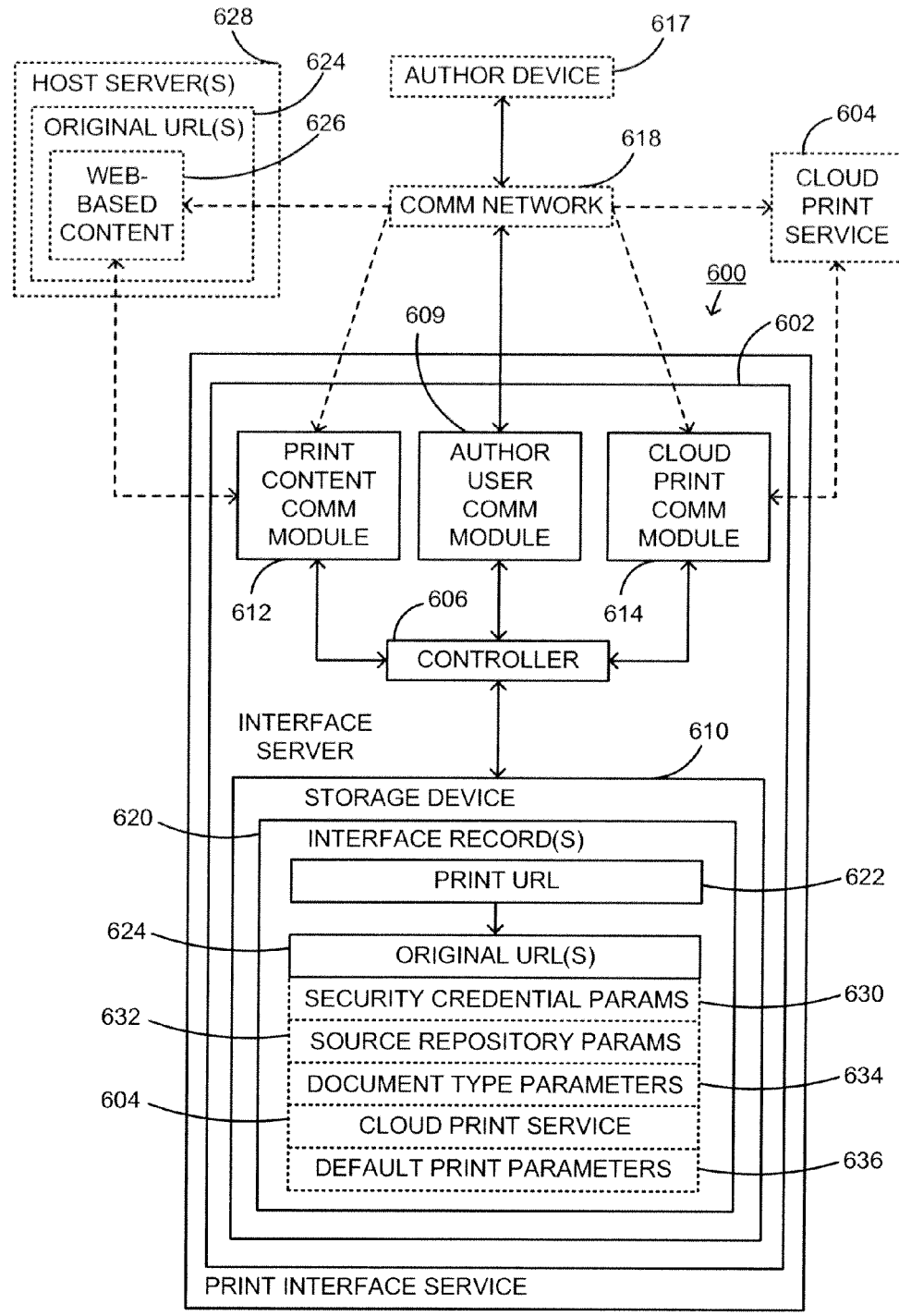
FIG. 6 is a block diagram of another exemplary embodiment of a print interface service for printing web-based content via a cloud print service.

With reference to FIGS. 5 and 6, an exemplary embodiment of a print interface service 600 for printing web-based content via a cloud print service includes an interface server 602 in operative communication with a cloud print service 604. An exemplary embodiment of the interface server 602 includes a controller 606, an author user communication module 609, a storage device 610, a print content communication module 612, and a cloud print communication module 614. The controller 606 for controlling operations of the interface server 602 to provide the print interface service 600. The communication network 618 may be any suitable type of communication network. The communication network 618 may include multiple communication networks of various types in any suitable combination.

The storage device 610 in operative communication with the controller 606 for at least temporarily storing an interface record 620 associated with a print request received by a consumer user communication module 508 (FIG. 5) from a user device 516 (FIG. 5) via the communication network 618. The interface record 620 being associated with a print URL 622 linked to one or more original URLs 624 comprising web-based content 626 desired to be printed via the cloud print service 604 by a consumer user using a user device. The print content communication module 612 in operative communication with the controller 606 for obtaining the web-based content 626 associated with the one or more original URLs 624 from one or more host servers 628 on which the corresponding web-based content 626 is stored. Communications between the print content communication module 612 and the one or more host servers 628 may be via the communication network 618 or via any suitable communication technique. The cloud print communication module 614 in operative communication with the controller 606 for sending a job request and the obtained web-based content to the cloud print service 604 for printing the desired web-based content 626 via the cloud print service 604 for the consumer user. Communications between the cloud print communication module 614 and the cloud print service 604 may be via the communication network 618 or via any suitable communication technique.

The author user communication module 609 in operative communication with the controller 606 for receiving a record request from an author device 617. The record request identifying the one or more original URLs 624 and requesting assignment of the print URL 622 from a plurality of unassigned print URLs managed by the controller 606. The controller 606 assigns the print URL 622 to the interface record 620 in response to the record request and stores the print URL 622, the one or more original URLs 624, and corresponding links between the print URL and one or more original URLs in the interface record 620.

In another embodiment of the print interface service 600, the print request received by the consumer user communication module 508 (FIG. 5) includes the print URL 622 assigned by the controller 606 such that the print request is thereby associated with the interface record 620 in conjunction the obtaining of the web-based content 626 by the print content communication module 612 and the sending of the job request and obtained web-based content by the cloud print communication module 614. In yet another embodiment of the print interface service 600, the controller 606 sends a parameter request to the user device 516 (FIG. 5) via the consumer user communication module 508 (FIG. 5) for confirmation by the consumer user of the one or more original URLs stored in the interface record 620 or for revision thereof by the consumer user. In this embodiment, the consumer user communication module 508 (FIG. 5) receives a parameter response from the user device 516 (FIG. 5) confirming or revising the one or more original URLs based at least in part on interaction by the consumer user.

In still another embodiment of the print interface service 600, the record request received by the author user communication module 609 includes security credential parameters 630 to restrict use of the print URL 622. The security credential parameters 630 are stored in the interface record 620 in conjunction with the storing of other information associated with the record request in the interface record 620. The controller 606 sends an authentication request to the user device 516 (FIG. 5) via the consumer user communication module 508 (FIG. 5) for security credential parameters for use of the print URL in response to receiving the print request. The consumer user communication module 508 (FIG. 5) receives an authentication response with security credential parameters from the user device 516 (FIG. 5). The controller 606 enables use of the print URL 622 in conjunction with the obtaining of the web-based content 626 by the print content communication module 612 and the sending of the job request and the obtained web-based content by the cloud print communication module 614 based at least in part on successfully authenticating the security credential parameters received in the authentication response with the security credential parameters 630 stored in the interface record 620.

In still yet another embodiment of the print interface service 600, the record request received by the author user communication module 609 includes source repository parameters 632 associated with the web-based content 626 desired to be printed. The source repository parameters 632 are stored in the interface record 620 in conjunction with the storing of other information associated with the record request in the interface record 620 such that the obtaining of the web-based content 626 by the print content communication module 612 is based at least in part on the source repository parameters 632 stored in the interface record 620. In a further embodiment of the print interface service 600, the controller 606 sends a parameter request to the user device 516 (FIG. 5) via the consumer user communication module 508 (FIG. 5) for confirmation by the consumer user of the source repository parameters 632 stored in the interface record 620 or for revision thereof by the consumer user. In this embodiment, the consumer user communication module 508 (FIG. 5) receives a parameter response from the user device 516 (FIG. 5) confirming or revising the source repository parameters 632 based at least in part on interaction by the consumer user.

In another embodiment of the print interface service 600, the record request received by the author user communication module 609 includes document type parameters 634 associated with the web-based content 626 desired to be printed. The document type parameters 634 are stored in the interface record 620 in conjunction with the storing of other information associated with the record request in the interface record 620 such that the obtaining of the web-based content 626 by the print content communication module 612 is based at least in part on the document type parameters 634 stored in the interface record 620. In a further embodiment of the print interface service 600, the controller 606 sends a parameter request to the user device 516 (FIG. 5) via the consumer user communication module 508 (FIG. 5) for confirmation by the consumer user of the document type parameters 634 stored in the interface record 620 or for revision thereof by the consumer user. In this embodiment, the consumer user communication module 508 (FIG. 5) receives a parameter response from the user device 516 (FIG. 5) confirming or revising the document type parameters 634 based at least in part on interaction by the consumer user.

In yet another embodiment of the print interface service 600, the record request received by the author user communication module 609 identifies the cloud print service 604 and the identified cloud print service 604 is stored in the interface record 620 in conjunction with the storing of other information associated with the record request in the interface record 602 such that the sending of the job request and obtained web-based content by the cloud print communication module 614 is based at least in part on the cloud print service 604 stored in the interface record 620. In a further embodiment of the print interface service 600, the controller 606 sends a parameter request to the user device 516 (FIG. 5) via the consumer user communication module 508 (FIG. 5) for confirmation by the consumer user of the cloud print service 604 stored in the interface record 620 or for revision thereof by the consumer user. In this embodiment, the consumer user communication module 508 (FIG. 5) receives a parameter response from the user device 516 (FIG. 5) confirming or revising the cloud print service 604 based at least in part on interaction by the consumer user.

In still another embodiment of the print interface service 600, the record request received by the author user communication module 609 includes default print parameters 636. The default print parameters 636 are stored in the interface record 620 in conjunction with the storing of other information associated with the record request in the interface record 620 such that the job request sent by the cloud print communication module 614 is based at least in part on the default print parameters 636 stored in the interface record 620. In a further embodiment of the print interface service 600, the controller 606 sends a parameter request to the user device 516 (FIG. 5) via the consumer user communication module 508 (FIG. 5) for confirmation by the consumer user of the default print parameters 636 stored in the interface record 620 or for revision thereof by the consumer user. In this embodiment, the consumer user communication module 508 (FIG. 5) receives a parameter response from the user device 516 (FIG. 5) confirming or revising the default print parameters 636 based at least in part on interaction by the consumer user.

With reference again to FIG. 5, in another embodiment of the print interface service 500, the controller 506 sends a parameter request to the user device 516 via the consumer user communication module 508 for identification of the one or more original URLs 524 by the consumer user. In this embodiment, the consumer user communication module 508 receives a parameter response from the user device 516 identifying the one or more original URLs 524 based at least in part on interaction by the consumer user.

In a further embodiment of the print interface service 500, the controller 506 assigns the print URL 522 to the interface record 520 and stores the print URL 522, the one or more original URLs 524, and corresponding links between the print URL and one or more original URLs in the interface record 520. In a yet further embodiment of the print interface service 500, the print request received by the consumer user communication module 508 includes the print URL 522 assigned by the controller 506 such that the print request is thereby associated with the interface record 520 in conjunction with the obtaining of the web-based content 526 by the print content communication module 512 and the sending of the job request and obtained web-based content by the cloud print communication module 514.

In another further embodiment of the print interface service 500, the parameter request sent by the controller 506 is also for identification of source repository parameters 532 by the consumer user. The source repository parameters 532 being associated with the web-based content 526 desired to be printed. In this embodiment, the source repository parameters 532 are identified in the parameter response received by the consumer user communication module 508 such that the obtaining of the web-based content by the print content communication module is based at least in part on the source repository parameters identified by the consumer user.

In yet another further embodiment of the print interface service 500, the parameter request sent by the controller 506 is also for identification of document type parameters 534 by the consumer user. The document type parameters 534 being associated with the web-based content 526 desired to be printed. In this embodiment, the document type parameters 534 are identified in the parameter response received by the consumer user communication module 508 such that the obtaining of the web-based content 526 by the print content communication module 512 is based at least in part on the document type parameters 534 identified by the consumer user.

In still another further embodiment of the print interface service 500, the parameter request sent by the controller 506 is also for identification of the cloud print service 504 by the consumer user. The cloud print service 504 is identified in the parameter response received by the consumer user communication module 508 such that the sending of the job request and obtained web-based content by the cloud print communication module 514 is based at east in part on the cloud print service 504 identified by the consumer user.

In still yet another further embodiment of the print interface service 500, the parameter request sent by the controller 506 is also for identification of default print parameters 536 by the consumer user. The default print parameters 536 are identified in the parameter response received by the consumer user communication module 508 such that the job request sent by the cloud print communication module 514 is based at least in part on the default print parameters 536 identified by the consumer user.

In another embodiment of the print interface service 500, the controller 506 sends a confirmation request to the user device 516 via the consumer user communication module 508 to permit the consumer user to authorize, revise, or cancel the job request prior to the cloud print communication module 514 sending the job request. In this embodiment, the consumer user communication module 508 receives a confirmation response from the user device 516 confirming, revising, or canceling the job request based at least in part on interaction by the consumer user.

Figure 7:
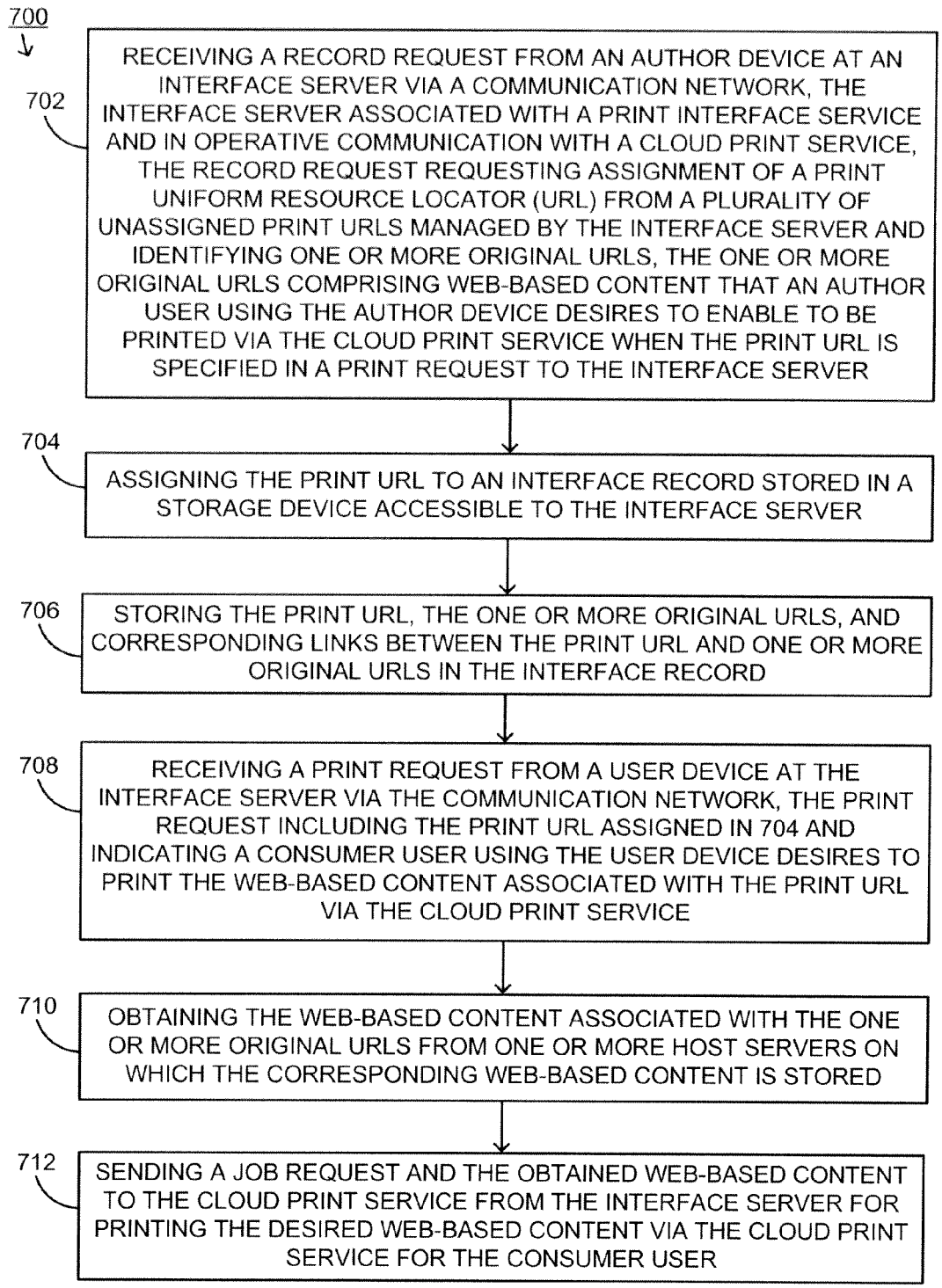
FIG. 7 is flowchart of still another exemplary embodiment of a process for printing web-based content via a cloud print service.

With reference to FIG. 7, an exemplary embodiment of a process 700 for printing web-based content via a cloud print service begins at 702 where a record request is received from an author device at an interface server via a communication network. The interface server being associated with a print interface service and in operative communication with a cloud print service. The record request requesting assignment of a print uniform resource locator (URL) from a plurality of unassigned print URLs managed by the interface server and identifying one or more original URLs. The one or more original URLs comprising web-based content that an author user using the author device desires to enable to be printed via the cloud print service when the print URL is specified in a print request to the interface server. Next, the print URL is assigned to an interface record stored in a storage device accessible to the interface server (704). At 706, the print URL, the one or more original URLs, and corresponding links between the print URL and one or more original URLs are stored in the interface record.

Next, a print request is received from a user device at the interface server via the communication network (708). The print request including the print URL assigned in 704 and indicating a consumer user using the user device desires to print the web-based content associated with the print URL via the cloud print service. At 710, the web-based content associated with the one or more original URLs is obtained from one or more host servers on which the corresponding web-based content is stored. Next, a job request and the obtained web-based content are sent to the cloud print service from the interface server for printing the desired web-based content via the cloud print service for the consumer user.

In another embodiment of the process 700, the print request received in d) is based at least in part on the consumer user activating an interactive control embedded in a content file displayed on the user device, the interactive control associated with a hypertext link that directs the print request to the print interface service after the interactive control is activated. In a further embodiment of this embodiment, the interactive control and the hypertext link were embedded in the content file by the author user using the author device prior to the content file being accessed by the consumer user via the user device. In another further embodiment of this embodiment, the web-based content desired to be printed comprises the content file displayed on the user device.

In yet another embodiment, the process 700 may also include sending a parameter request to the user device from the interface server for confirmation by the consumer user of the one or more original URLs stored in the interface record or for revision thereof by the consumer user. In this embodiment, a parameter response is received from the user device confirming or revising the one or more original URLs based at least in part on interaction by the consumer user.

In still another embodiment of the process 700, the record request received in 702 includes security credential parameters to restrict use of the print URL. The security credential parameters are stored in the interface record in conjunction with the storing in 706. In this embodiment, the process may also include sending an authentication request to the user device for security credential parameters for use of the print URL in response to receiving the print request in 708. Next, an authentication response with security credential parameters is received from the user device at the interface server. The process 700 continues by enabling use of the print URL in conjunction with the obtaining in 710 and the sending in 712 based at least in part on successfully authenticating the security credential parameters received in the authentication response with the security credential parameters stored in the interface record.

In still yet another embodiment of the process 700, the record request received in 702 includes source repository parameters associated with the web-based content desired to be printed. The source repository parameters are stored in the interface record in conjunction with the storing in 706 such that the obtaining in 710 is based at least in part on the source repository parameters stored in the interface record. In a further embodiment, the process 700 may also include sending a parameter request to the user device from the interface server for confirmation by the consumer user of the source repository parameters stored in the interface record or for revision thereof by the consumer user. In this embodiment, a parameter response is received from the user device confirming or revising the source repository parameters based at least in part on interaction by the consumer user.

In another embodiment of the process 700, the record request received in 702 includes document type parameters associated with the web-based content desired to be printed. The document type parameters are stored in the interface record in conjunction with the storing in 706 such that the obtaining in 710 is based at least in part on the document type parameters stored in the interface record. In a further embodiment, the process 700 may also include sending a parameter request to the user device from the interface server for confirmation by the consumer user of the document type parameters stored in the interface record or for revision thereof by the consumer user. In this embodiment, a parameter response is received from the user device confirming or revising the document type parameters based at least in part on interaction by the consumer user.

In yet another embodiment of the process 700, the record request received in 702 identifies the cloud print service. The identified cloud print service is stored in the interface record in conjunction with the storing in 706 such that the sending in 712 is based at least in part on the cloud print service stored in the interface record. In a further embodiment, the process 700 may also include sending a parameter request to the user device from the interface server for confirmation by the consumer user of the cloud print service stored in the interface record or for revision thereof by the consumer user. In this embodiment, a parameter response is received from the user device confirming or revising the cloud print service based at least in part on interaction by the consumer user.

In still another embodiment of the process 700, the record request received in 702 includes default print parameters. The default print parameters are stored in the interface record in conjunction with the storing in 706 such that the job request associated with the sending in 712 is based at least in part on the default print parameters stored in the interface record. In a further embodiment, the process 700 may also include sending a parameter request to the user device from the interface server for confirmation by the consumer user of the default print parameters stored in the interface record or for revision thereof by the consumer user. In this embodiment, a parameter response is received from the user device confirming or revising the default print parameters based at least in part on interaction by the consumer user.

In still yet another embodiment, the process 700 may also include sending a parameter request to the user device from the interface server for identification of source repository parameters by the consumer user, the source repository parameters associated with the web-based content desired to be printed. Next, a parameter response is received from the user device identifying the source repository parameters based at least in part on interaction by the consumer user. In this embodiment, the obtaining in 710 is based at least in part on the source repository parameters identified by the consumer user.

In another embodiment, the process 700 may also include sending a parameter request to the user device from the interface server for identification of document type parameters by the consumer user, the document type parameters associated with the web-based content desired to be printed. Next, a parameter response is received from the user device identifying the document type parameters based at least in part on interaction by the consumer user. In this embodiment, the obtaining in 710 is based at least in part on the document type parameters identified by the consumer user.

In another embodiment, the process 700 may also include sending a parameter request to the user device from the interface server for identification of the cloud print service by the consumer user. Next, a parameter response is received from the user device identifying the cloud print service based at least in part on interaction by the consumer user. In this embodiment, the sending in 712 is based at least in part on the cloud print service identified by the consumer user.

In yet another embodiment, the process 700 may also include sending a parameter request to the user device from the interface server for identification of default print parameters by the consumer user. Next, a parameter response is received from the user device identifying the default print parameters based at least in part on interaction by the consumer user. In this embodiment, the job request associated with the sending in 712 is based at least in part on the default print parameters identified by the consumer user.

In still another embodiment, the process may also include sending a confirmation request to the user device from the interface server to permit the consumer user to authorize, revise, or cancel the job request in conjunction with the sending in 712. In this embodiment, a confirmation response is received from the user device confirming, revising, or canceling the job request based at least in part on interaction by the consumer user.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for printing web-based content via a cloud print service, comprising:
   a) receiving a print request from a user device at an interface server via a communication network, the interface server being associated with a print interface service and in operative communication with a cloud print service, the print request including a print uniform resource locator (URL) previously assigned to an interface record at least temporarily stored in a storage device accessible to the interface server, the interface record including the print URL, one or more original URLs previously associated with the print URL, and corresponding links between the print URL and the one or more original URLs, the one or more original URLs comprising web-based content desired to be printed via the cloud print service by a consumer user using the user device;
   b) obtaining the web-based content associated with the one or more original URLs from one or more host servers on which the corresponding web-based content is stored; and
   c) sending a job request and the obtained web-based content to the cloud print service from the interface server for printing the desired web-based content via the cloud print service for the consumer user.

2. The method set forth in claim 1, further comprising:
   d) receiving a record request from an author device at the interface server, the record request identifying the one or more original URLs and requesting assignment of the print URL from a plurality of unassigned print URLs managed by the interface server;
   e) assigning the print URL to the interface record; and
   f) storing the print URL, the one or more original URLs, and corresponding links between the print URL and one or more original URLs in the interface record.

3. The method set forth in claim 2, further comprising:
   g) sending a parameter request to the user device from the interface server for confirmation by the consumer user of the one or more original URLs stored in the interface record or for revision thereof by the consumer user; and
   h) receiving a parameter response from the user device confirming or revising the one or more original URLs based at least in part on interaction by the consumer user.

4. The method set forth in claim 2 wherein the record request received in d) includes security credential parameters to restrict use of the print URL and the security credential parameters are stored in the interface record in conjunction with the storing in f), the method further comprising:

g) sending an authentication request to the user device for security credential parameters for use of the print URL in response to receiving the print request in a);

h) receiving an authentication response with security credential parameters from the user device at the interface server; and i) enabling use of the print URL in conjunction with the obtaining in b) and the sending in c) based at least in part on successfully authenticating the security credential parameters received in the authentication response with the security credential parameters stored in the interface record.

5. The method set forth in claim 2 wherein the record request received in d) includes source repository parameters associated with the web-based content desired to be printed and the source repository parameters are stored in the interface record in conjunction with the storing in f) such that the obtaining in b) is based at least in part on the source repository parameters stored in the interface record.

6. The method set forth in claim 2 wherein the record request received in d) includes document type parameters associated with the web-based content desired to be printed and the document type parameters are stored in the interface record in conjunction with the storing in f) such that the obtaining in b) is based at least in part on the document type parameters stored in the interface record.

7. The method set forth in claim 2 wherein the record request received in d) identifies the cloud print service and the identified cloud print service is stored in the interface record in conjunction with the storing in f) such that the sending in c) is based at least in part on the cloud print service stored in the interface record.

8. The method set forth in claim 2 wherein the record request received in d) includes default print parameters and the default print parameters are stored in the interface record in conjunction with the storing in f) such that the job request associated with the sending in c) is based at least in part on the default print parameters stored in the interface record.

9. The method set forth in claim 1, further comprising:
d) sending a parameter request to the user device from the interface server for identification of the one or more original URLs by the consumer user; and
e) receiving a parameter response from the user device identifying the one or more original URLs based at least in part on interaction by the consumer user.

10. The method set forth in claim 9, further comprising:
f) assigning the print URL to the interface record; and
g) storing the print URL, the one or more original URLs, and corresponding links between the print URL and one or more original URLs in the interface record.

11. The method set forth in claim 9 wherein the parameter request sent in d) is also for identification of source repository parameters by the consumer user, the source repository parameters being associated with the web-based content desired to be printed, and the source repository parameters are identified in the parameter response received in e) such that the obtaining in b) is based at least in part on the source repository parameters identified by the consumer user.

12. The method set forth in claim 9 wherein the parameter request sent in d) is also for identification of document type parameters by the consumer user, the document type parameters being associated with the web-based content desired to be printed, and the document type parameters are identified in the parameter response received in e) such that the obtaining in b) is based at least in part on the document type parameters identified by the consumer user.

13. The method set forth in claim 9 wherein the parameter request sent in d) is also for identification of the cloud print service by the consumer user and the cloud print service is identified in the parameter response received in e) such that the sending in c) is based at least in part on the cloud print service identified by the consumer user.

14. The method set forth in claim 9 wherein the parameter request sent in d) is also for identification of default print parameters by the consumer user and the default print parameters are identified in the parameter response received in e) such that the job request associated with the sending in c) is based at least in part on the default print parameters identified by the consumer user.

15. The method set forth in claim 1, further comprising:
d) sending a confirmation request to the user device from the interface server to permit the consumer user to authorize, revise, or cancel the job request in conjunction with the sending in c); and
e) receiving a confirmation response from the user device confirming, revising, or canceling the job request based at least in part on interaction by the consumer user.

16. An apparatus for printing web-based content via a cloud print service, comprising:
an interface server in operative communication with a cloud print service, the interface server comprising:
a controller for controlling operations of the interface server to provide a print interface service;
a consumer user communication module in operative communication with the controller for receiving a print request from a user device via a communication network;
a storage device in operative communication with the controller for at least temporarily storing an interface record, the print request including a print uniform resource locator (URL) previously assigned to the interface record, the interface record including the print URL, one or more original URLs previously associated with the print URL, and corresponding links between the print URL and the one or more original URLs, the one or more original URLs comprising web-based content desired to be printed via the cloud print service by a consumer user using the user device;
a print content communication module in operative communication with the controller for obtaining the web-based content associated with the one or more original URLs from one or more host servers on which the corresponding web-based content is stored; and
a cloud print communication module in operative communication with the controller for sending a job request and the obtained web-based content to the cloud print service for printing the desired web-based content via the cloud print service for the consumer user.

17. The apparatus set forth in claim 16, further comprising:
an author user communication module for receiving a record request from an author device, the record request identifying the one or more original URLs and requesting assignment of the print URL from a plurality of unassigned print URLs managed by the controller;
wherein the controller assigns the print URL to the interface record in response to the record request and stores the print URL, the one or more original URLs, and corresponding links between the print URL and one or more original URLs in the interface record.

18. The apparatus set forth in claim 17 wherein the controller sends a parameter request to the user device via the consumer user communication module for confirmation by the consumer user of the one or more original URLs stored in the interface record or for revision thereof by the consumer user and the consumer user communication module receives a parameter response from the user device confirming or revising the one or more original URLs based at least in part on interaction by the consumer user.

19. The apparatus set forth in claim 17 wherein the record request received by the author user communication module includes security credential parameters to restrict use of the print URL and the security credential parameters are stored in the interface record in conjunction with the storing of other information associated with the record request in the interface record,
wherein the controller sends an authentication request to the user device via the consumer user communication module for security credential parameters for use of the print URL in response to receiving the print request;
wherein the consumer user communication module receives an authentication response with security credential parameters from the user device;
wherein the controller enables use of the print URL in conjunction with the obtaining of the web-based content by the print content communication module and the sending of the job request and the obtained web-based content by the cloud print communication module based at least in part on successfully authenticating the security credential parameters received in the authentication response with the security credential parameters stored in the interface record.

20. The apparatus set forth in claim 16 wherein the controller sends a parameter request to the user device via the consumer user communication module for identification of the one or more original URLs by the consumer user and the consumer user communication module receives a parameter response from the user device identifying the one or more original URLs based at least in part on interaction by the consumer user.

21. The apparatus set forth in claim 20 wherein the controller assigns the print URL to the interface record and stores the print URL, the one or more original URLs, and corresponding links between the print URL and one or more original URLs in the interface record.

22. A method for printing web-based content via a cloud print service, comprising:
a) receiving a record request from an author device at an interface server via a communication network, the interface server being associated with a print interface service and in operative communication with a cloud print service, the record request requesting assignment of a print uniform resource locator (URL) from a plurality of unassigned print URLs managed by the interface server and identifying one or more original URLs, the one or more original URLs comprising web-based content that an author user using the author device desires to enable to be printed via the cloud print service when the print URL is specified in a print request to the interface server;
b) assigning the print URL to an interface record stored in a storage device accessible to the interface server;
c) storing the print URL, the one or more original URLs, and corresponding links between the print URL and one or more original URLs in the interface record;
d) receiving a print request from a user device at the interface server via the communication network, the print request including the print URL assigned in b) and indicating a consumer user using the user device desires to print the web-based content associated with the print URL via the cloud print service;
e) obtaining the web-based content associated with the one or more original URLs from one or more host servers on which the corresponding web-based content is stored; and
f) sending a job request and the obtained web-based content to the cloud print service from the interface server for printing the desired web-based content via the cloud print service for the consumer user.

23. The method set forth in claim 22 wherein the print request received in d) is based at least in part on the consumer user activating an interactive control embedded in a content file displayed on the user device, the interactive control being associated with a hypertext link that directs the print request to the print interface service after the interactive control is activated.

24. The method set forth in claim 22, further comprising:
g) sending a parameter request to the user device from the interface server for confirmation by the consumer user of the one or more original URLs stored in the interface record or for revision thereof by the consumer user; and
h) receiving a parameter response from the user device confirming or revising the one or more original URLs based at least in part on interaction by the consumer user.

25. The method set forth in claim 22 wherein the record request received in a) includes security credential parameters to restrict use of the print URL and the security credential parameters are stored in the interface record in conjunction with the storing in c), the method further comprising:
g) sending an authentication request to the user device for security credential parameters for use of the print URL in response to receiving the print request in d);
h) receiving an authentication response with security credential parameters from the user device at the interface server; and
i) enabling use of the print URL in conjunction with the obtaining in e) and the sending in f) based at least in part on successfully authenticating the security credential parameters received in the authentication response with the security credential parameters stored in the interface record.

* * * * *